United States Patent [19]

Shih et al.

[11] Patent Number: 5,076,662

[45] Date of Patent: Dec. 31, 1991

[54] ELECTRO-OPTICAL IFS FINDER

[75] Inventors: I-Fu Shih, Los Alamitos; David B. Chang, Tustin; Norton L. Moise, Pacific Palisades; James E. Drummond, Oceanside, all of Calif.

[73] Assignee: Hughes Aircraft Company, Los Angeles, Calif.

[21] Appl. No.: 340,655

[22] Filed: Apr. 20, 1989

[51] Int. Cl.[5] .................... G02B 27/42; G06K 9/62; G06F 15/336

[52] U.S. Cl. .................... 359/36; 382/30; 382/42; 382/45; 382/46; 382/47; 364/822; 359/559; 359/561; 359/107

[58] Field of Search .................... 350/162.12, 162.13, 350/572, 321, 162.14, 162.15, 356; 382/41, 42, 44, 45, 46, 47, 30, 31; 364/815, 816, 822, 826

[56] References Cited

U.S. PATENT DOCUMENTS 2,927,216 3/1960 Lohninger .................... 382/46
3,701,098 10/1972 Acker .................... 382/45
4,198,125 4/1980 Tatian et al. .................... 350/162.13
4,637,056 1/1987 Sherman et al. .................... 350/162.13
4,669,048 5/1987 Ackerman et al. .................... 350/136
4,789,933 12/1988 Chen et al. .................... 382/54
4,790,025 12/1988 Inoue et al. .................... 382/44

*Primary Examiner*—Bruce Y. Arnold
*Assistant Examiner*—R. D. Shafer
*Attorney, Agent, or Firm*—Michael W. Sales; Wanda K. Denson-Low

[57] ABSTRACT

An electro-optical system that implements the self-tiling process of fining proper Iterated Function Systems for modeling natural objects. The system can operate in two different modes, a real-time interactive mode and an automated mode. The purpose of the system is to speed up the process of finding a proper IFS for a given object to be modeled. The system makes use of optical processing, including optical means for rotating, magnifying/demagnifying and translating an input image. Optical beamsplitters are used to combine transformed images to produce a tiled output image. In one embodiment, an automated controller evaluates the goodness of the match between the tiled image and the input image and generates control signals which cause adjustment of the settings of the optical means. The process is repeated automatically until the match is sufficiently good. The invention can also be operated in a manual, man-in-the-loop mode.

8 Claims, 5 Drawing Sheets

ELECTRO-OPTICAL IFS FINDER

BACKGROUND OF THE INVENTION

The present invention relates to the self-tiling process of finding Iterated Function Systems (IFS) for modeling natural objects, and more particularly to an electro-optical system for performing the self-tiling process in order to find an optimal IFS for modeling a given object.

An affine transformation is a mathematical transformation equivalent to a rotation, translation, and contraction/expansion with respect to a fixed origin and coordinate system. In computer graphics, affine transformation can be used to generate fractal objects which have significant potential for modelling natural objects, such as trees, mountains and the like.

The Collage Theorem allows one to encode an image as an IFS. See, *M. F. Barnsley et al.*, "Solution of an Inverse Problem for Fractals and Other Sets," available from the School of Mathematics, Georgia Institute of Technology, Atlanta, Ga. 30332. An IFS is a set of j mappings ($M_1, M_2, \ldots M_j$), each representing a particular affine transformation, that have a corresponding set of j probabilities ($P_1, P_2, \ldots P_j$). The j probabilities can be thought of as weighting factors for each of the corresponding j mappings or transformations. See, e.g., L. Demko et al., "Construction of Fractal Objects with Iterated Function Systems," Computer Graphics, Vol. 19(3), pages 271–278, July, 1985, SIGGRAPH '85 Proceedings.

An IFS "attractor" is the set about which the random walk eventually clusters. The use of an IFS attractor to model a given object can provide significant data compression. However, this method is practical only if there exists a reasonably easy way to find the proper IFS to encode the object.

Informally, the object can be viewed as the settheoretic union of several sub-objects that are (smaller) copies of itself. The original object can be tiled with two or more sub-objects and the original object reproduced as long as the tiling scheme completely covers the original object, even if this means that two or more of the tiles overlap. If these conditions are met, an IFS can be determined or found whose attractor will be the original object. The accuracy of the resultant image is directly proportional to the exactness of the self-tiling process.

The self-tiling process of finding a proper IFS has been digitally automated with a simulated thermal annealing algorithm to adjust the parameters. The process starts with a rough tiling, and compares its initial tiled image with the object to be modeled. The measure of how well the tiled image matches the object is provided by computing the associated Hausdorff distances. The goal is to minimize the Hausdorff distance at each iteration. This process is repeated until a satisfactory match is achieved.

Thus, digital computation has been employed to perform contractive affine transformations of the original object and to compose a tiled image from a collection of these transformed images. The conventional digital process involves a great amount of computation on affine transformations and Hausdorff distances, and so it is slow.

SUMMARY OF THE INVENTION

It would be advantageous to provide a finder of an IFS for a given object which is not computationally intensive and which is relatively fast. These and other advantages are obtained by the invention, wherein an optical processor is provided for finding a proper IFS to model a given object. The optical processor includes means for providing an input image of the object to be modelled, and means for directing the input image through a plurality of optical branches.

Each optical branch includes means for optically performing an affine transformation on the input image. Thus, each branch includes means for selectively optically rotating the input image, means for selectively optically magnifying or demagnifying the input image, and means for selectively optically translating the input image so as to perform the desired affine transformation in the respective optical branch.

The optical processor further comprises means for combining the respective transformed images from the respective optical branches at an output image plane to provide a tiled image of the object. The proper IFS may be formed by adjusting the respective optical rotating, magnifying or demagnifying, and/or translating means until the output tiled image converges to a suitable likeness of the input image.

The process of finding the proper IFS can be automated by providing means for comparing the input image with the output tiled image, providing servomechanisms for setting the various optical rotating, magnifying and translating means, and systematically changing the parameters to find the best match between the tiled image and the input image.

BRIEF DESCRIPTION OF THE DRAWINGS

These and other features and advantages of the present invention will become more apparent from the following detailed description of exemplary embodiments thereof, as illustrated in the accompanying drawings, in which.

DETAILED DESCRIPTION OF THE PREFERRED EMBODIMENTS

This invention provides an electro-optical system to perform self-tiling optically, and provides a very efficient real-time interactive system for finding a proper IFS for a given object. Furthermore, the process can be automated by the addition of an image comparison algorithm and servomechanisms to position the optical elements.

Figure 1:
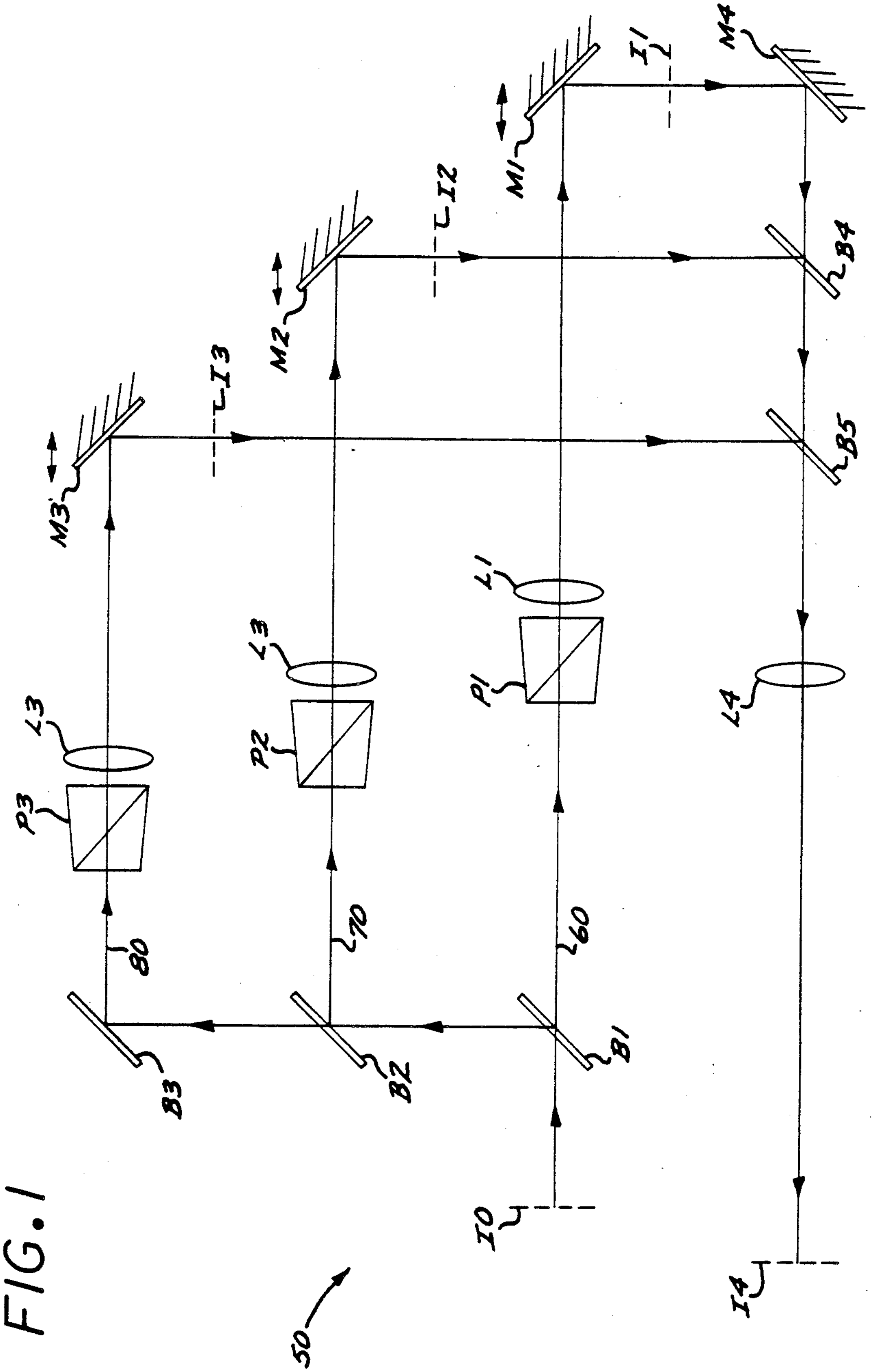
FIG. 1 illustrates an electro-optic system for finding a proper IFS in accordance with the invention.

FIG. 1 shows an electro-optical system 50 in accordance with the invention. An image of the object to be modeled is presented at the input image plane IO. For example, the image of the object, say a maple leaf, is recorded on a photographic film, and the film is placed at the image plane IO. A light source such as that used in a slide projector may be used to illuminate the film.

The input image undergoes several (three are shown in FIG. 1) affine transformations, by branching the light of the input image into several optical branches including light paths 60, 70 and 80, employing beamsplitters B1, B2, and B3 to perform the optical branching. The branching ratios of the beamsplitters is such that image light of equal intensity is provided at each branch.

Beamsplitters for performing the functions of devices B1, B2 and B3 are well known in the art. See, for example, W. J. Smith, "Modern Optical Engineering," pages 94–95, McGraw-Hill (1966).

To illustrate the optical affine transformations, consider the object image light traversing the first branch 60. The object is imaged onto the intermediate image plane I1 through the imaging zoom lens L1 that provides a magnification or demagnification as required by the subject affine transformation. This corresponds to a scaling operation for the subject affine transformation. The amount of rotation is controlled by the setting of the rotating prism P1. This prism could be a Harting-Dove or a Pechan prism. The required translation for the affine transformation is generated by shifting the translating mirror M1. Conventional means are provided to position the optical elements P1, L1 and M1 at desired settings or positions.

The optical system 50 is designed with sufficient depth of focus to ensure that a slight change of path length will not introduce significant blur. The image thus formed at the first image plane I1 represents the original object having undergone an affine transformation. This transformed image is then relayed to the output image plane I4 via relay mirror M4 and through the relay lens L4.

The second optical branch 70 receives input image light via beamsplitters B1 and B2, and also includes a rotating prism P2, and imaging lens L2, and a translating mirror M2. These optical elements provide the rotation, scaling and translating required for the affine transformation performed by the second optical branch 70. The image thus formed at the second image plane I2 has undergone a second affine transformation. The transformed image light is combined with the transformed image light from the first optical branch 60 at beamsplitter B4.

The third optical branch 80 receives input image light via beamsplitters B1, B2 and B3, and also includes a rotating prism P3, an imaging lens L3 for imaging the input image light at the third image plane I3, and a translating mirror M3. These optical elements provide the rotation, scaling and translation required for the affine transformation performed by the third optical branch 80. The image thus formed at the third image plane I3 has undergone a third affine transformation. The transformed image light is combined with the transformed image light from the first and second optical branches 60 and 70 at beamsplitter B5. Conventional means are provided to position the optical elements P3, L3 and M3 at desired setting or positions.

A tiled image is formed at the fourth image plane I4 when the images formed in the different optical branches are combined through the mirror M4 and the beamsplitters B4 and B5. Since the tiled image is formed optically, one can observe the changing of the tiled image while adjusting the setting of the rotating mirrors, the zoom lenses and the translating mirrors. The settings that yield the best tiled image determines the proper IFS for the given object, i.e., the IFS is defined by the probabilities associated with each branch and the particular amounts of rotation, scaling and translation performed by each optical branch. Thus, the system provides a very efficient man-in-the-loop real-time interactive system.

This system can be automated with the addition of an image processor, e.g., an image detector array at the fourth image plane I4 for recording and digitizing the tiled image, and a suitable algorithm (described below) for evaluating the goodness of the match between the input image and the tiled image, and appropriate servomechanisms for positioning the various optical elements in each branch in response to control signals. An input image processor can be provided to record and digitize the input object image, permitting direct digital comparison of corresponding pixel values comprising the input (reference) image and the tiled output image.

Figure 2:
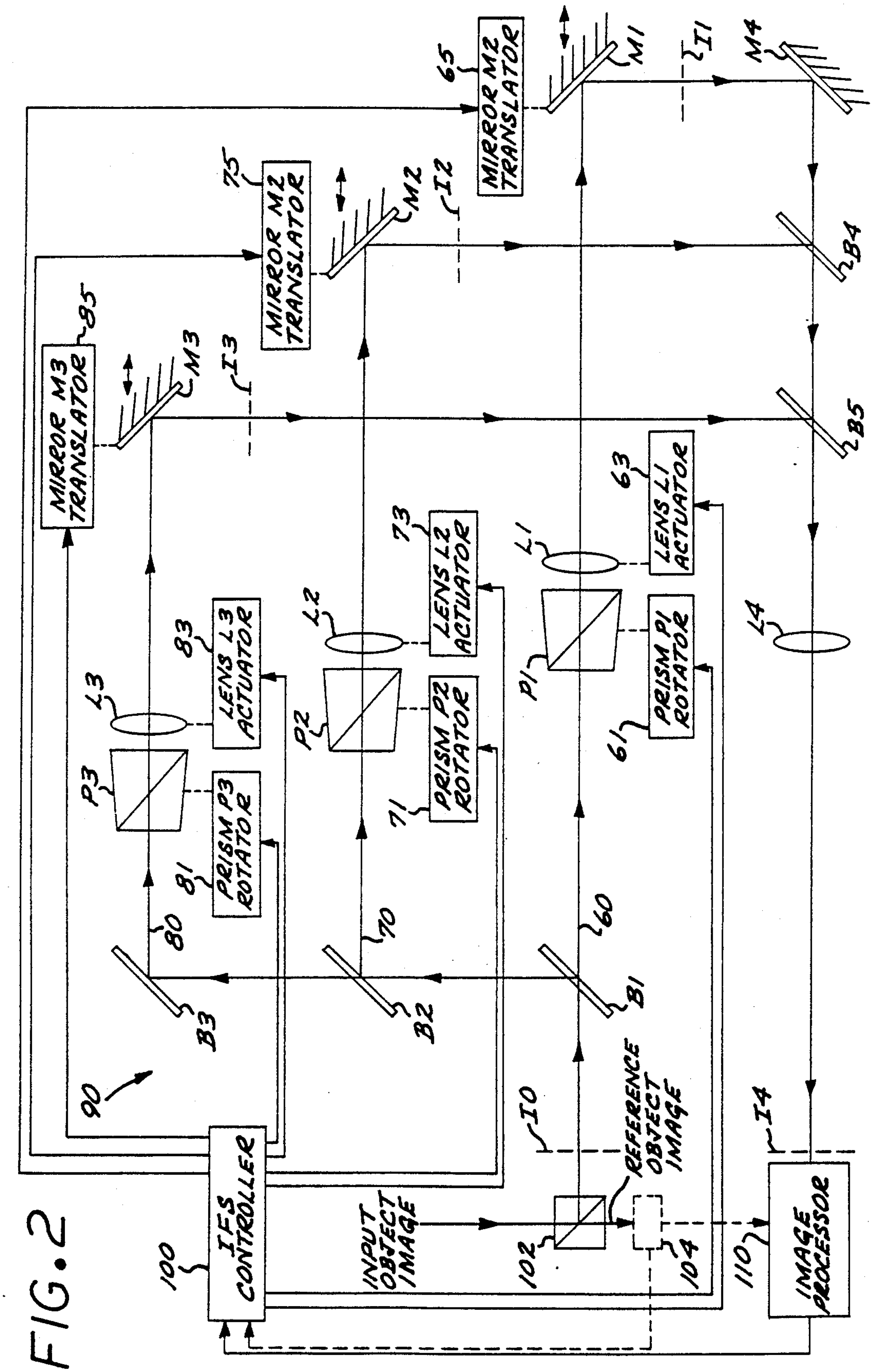
FIG. 2 is a simplified block diagram illustrative of an automated electro-optic system for finding an optimal IFS in accordance with the invention.

FIG. 2 is a simplified block diagram of such an automated IFS finder system 90. Elements in FIG. 2 correspond to like numbered or designated elements in FIG. 1. The IFS finder system 90 also includes a beamsplitter 102 which splits a portion of the input image light away as a reference object image. Depending on the particular technique employed to compare the input image with the tiled output image, i.e., digital or optical comparison, the reference object image may either be detected and digitized by an image detector array (shown in phantom as block 104) or directed to an optical processor (described below with respect to FIGS. 4 and 5) for comparison with the output tiled image. If a digital comparison is utilized, then the detector array 104 may comprise, for example, a CCD imager, Model TK2048M, marketed by Tektronix, Inc., Beaverton, Oreg.

The input object image is then passed through three optical branches which perform three respective affine transformations on the input image, identically to the processing described with regard to FIG. 1. The respective transformed images are combined and imaged at the output plane I4, as described with respect to FIG. 1.

The tiled output image is processed by image processor 110, whose output is coupled to the IFS controller 100.

If a digital image comparison is utilized by the system 90, then the image processor 110 comprises an image detector array for recording and digitizing the tiled output image, and providing a digital data representation thereof to the IFS controller 100. The controller in this case receives a corresponding digital data representation of the input object image, and compares the two images pixel-by-pixel to determine the differences between the images. To determine a difference value for the comparison, a running total may be kept of the number of pixel locations in which the respective images have different values.

As an alternative to the digital image comparison, an optical image comparison may be employed by the IFS finder system 90. The image processor 110 performs an optical comparison of the reference object image and the tiled output image. In this case, no detector array 104 is needed, the reference image being directed to the image processor 110. Two exemplary optical processors suitable for the function of processor 110 are described with respect to FIGS. 4 and 5.

The IFS controller 100 is responsive to information received from the image processor 110, and controls the settings and positions of the optical elements through the various servomechanisms 61, 63, 65, 71, 73, 75, 81, 83 and 85. The controller 100 may comprise, for example, a digital computer for processing the detector information (i.e., the algorithm for determining "goodness") and determining the proper settings, and associated peripheral devices for providing the control signals to the various servomechanisms.

To control the settings of the respective rotating prisms 61, 71, 81, the prisms may be mechanically mounted in respective rotatable fixtures, which may in turn be positioned by the respective servomechanisms 61, 71 and 81. There are many known servomechanisms suitable for the purpose, including stepper motors with or without position encoders.

The lenses L1, L2, L3 are adjustable over a range of magnification and/or demagnification; a zoom lens may be employed, for example. The respective lens devices L1, L2, L3 may be actuated by respective mechanisms or actuators 63, 73, 83, each of which comprises a servomechanism such as a stepper motor drive, to adjust the zoom lens elements to provide the desired magnification/demagnification.

The translatable mirrors M1, M2, M3 are mounted for translating movement along the respective optical paths. One exemplary type of translating equipment suitable for the purpose includes a leadscrew driven carriage which carries the respective mirror, and a servomechanism to serve as the respective element 65, 75 or 85, such as a stepper motor drive which turns the leadscrew to place the respective mirror at a desired position. If the necessary range of movement of the mirrors M1, M2 and M3 is sufficiently large, it may be necessary also to mount the mirror M4 and the respective beamsplitters B4 and B5 on respective translational apparatus so that the respective element M4, B4 and B5 moves in parallel synchronism with its corresponding element M1, M2 and M3.

One exemplary algorithm used for iteratively varying the system parameters to find the IFS with a good match, will vary one parameter at a time systematically, and generate an array of results, i.e., the differences between the tiled images and the object. The computer can be used to automatically store the parameters and the corresponding results. The computer can, after systematically varying the parameters, find the optimal result, i.e., the minimum of the differences, and its corresponding parameters, i.e., the optimal IFS.

The automated process starts with a trial design of the tiling. This initial tiled image is compared to the object by taking the difference between the two. The goal is to minimize the difference. Because of the high speed of the optical affine transformation process, it is possible to vary the parameters of the affine mappings in a systematic way to find the best match. This process requires more iterations, but much less digital computation. Overall, it will be much faster than a conventional purely digital process that calculates Hausdorff distances and which uses the simulated thermal annealing algorithm for automation.

In the purely digital, conventional process, it is necessary to involve rather tedious calculations of Hausdorff distances, because the relatively slow digital process does not permit searching through all parameters systematically. The method of calculating Hausdorff distances is described, for example, in "Fractals and Self Similarity," J. E. Hutchinson, Indiana University Mathematics Journal, Vol. 30, No. 5, 1981, pages 718–720.

Figure 3:
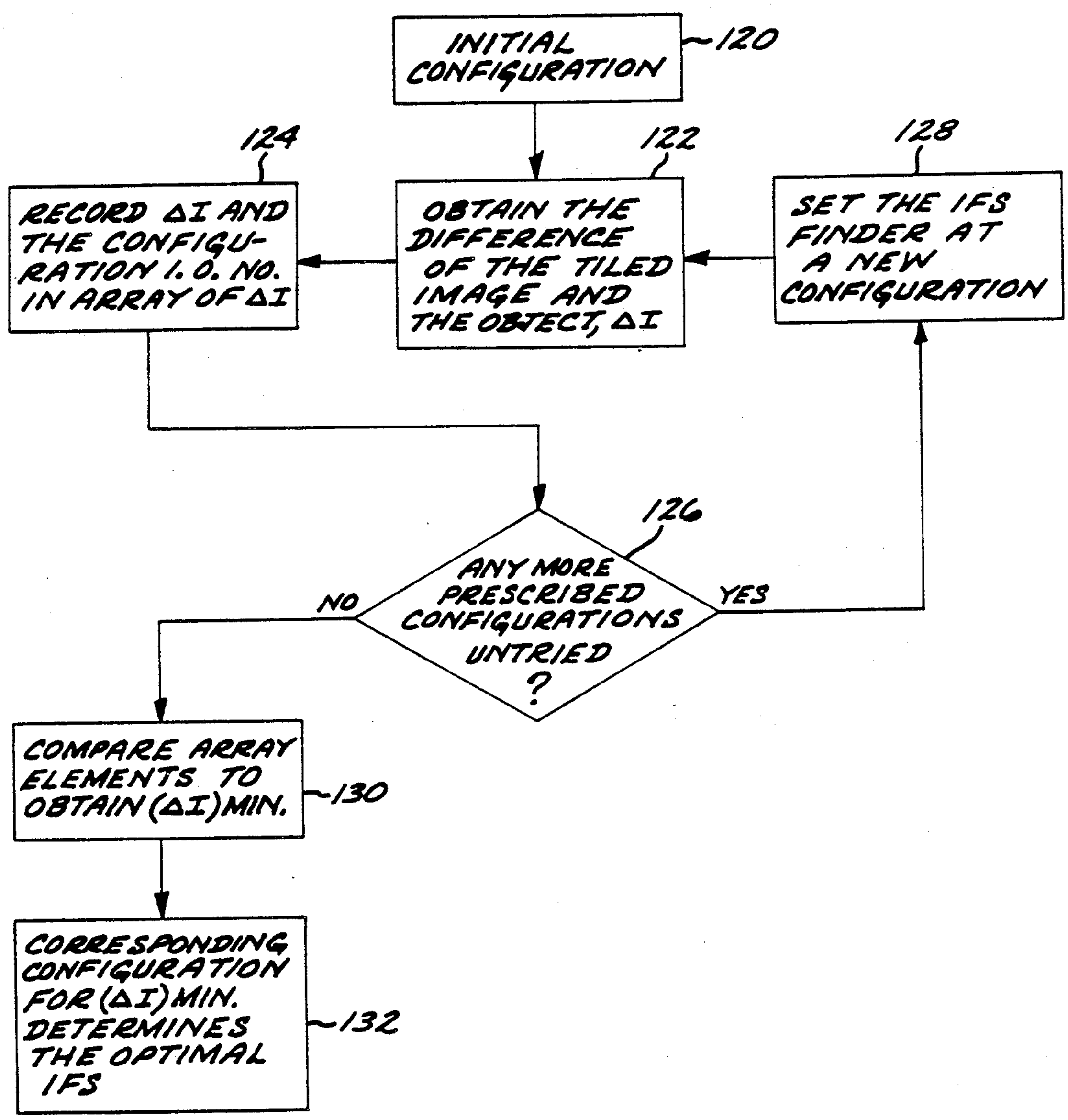
FIG. 3 is a simplified flow diagram illustrative of an exemplary algorithm for controlling the system of FIG. 2 to find an optimal IFS.

FIG. 3 illustrates a simplified flow diagram of an exemplary algorithm for operating the system of FIG. 2 to find an optimal IFS. At step 120 the system is set to an initial configuration, i.e., the rotating prisms, the lenses and the translatable mirrors are set to an initial position. Next, the difference is obtained between the output tiled image and input image of the object. The difference can be obtained by a digital comparison of corresponding pixel values, for example. Other techniques may also be employed to obtain a comparison value representing the difference (ΔI), including the coherent optical processing described below with respect to FIG. 4 or the incoherent optical processing described below with respect to FIG. 5. In the digital comparison, the goodness of the match can be defined as the sum of the differences of corresponding pixels of the tiled output image at image plane I4 and the reference object image.

At step 124 the difference value is recorded in memory with an identification of the corresponding IFS configuration. If any more prescribed configurations of the system remain untried (step 126), the IFS finder system is set at a new configuration (step 128), and steps 122 and 124 are repeated. Once all prescribed configurations of the system have been tried, then the stored array elements are compared (step 130) to obtain the minimum difference value. The corresponding configuration for this minimum difference value is determined to be the optimal IFS (step 132).

Instead of taking the difference of the tiled image and the object digitally, the evaluation of the tiling process can also be done optically. For example, a liquid crystal light valve can be used to convert the output tiled image into a coherent light source. The tiled image can be correlated with the original object using traditional coherent optical processing. The use of liquid crystal light valves in optical data processing, including image subtraction, is known in the art. See, for example, "Application of the Liquid Crystal Light Valve to Real-Time Optical Data Processing," W. P. Bleha et al., Optical Engineering, Vol. 17, No. 4, July-August 1978, pages 371–384. Coherent optical processing of images to perform image subtraction is also described in "Real-time image subtraction using a liquid crystal light valve," E. Marom, Optical Engineering, Vol. 25, No. 2, February 1986, pages 274–276. The entire contents of both references are incorporated herein by this reference.

Figure 4:
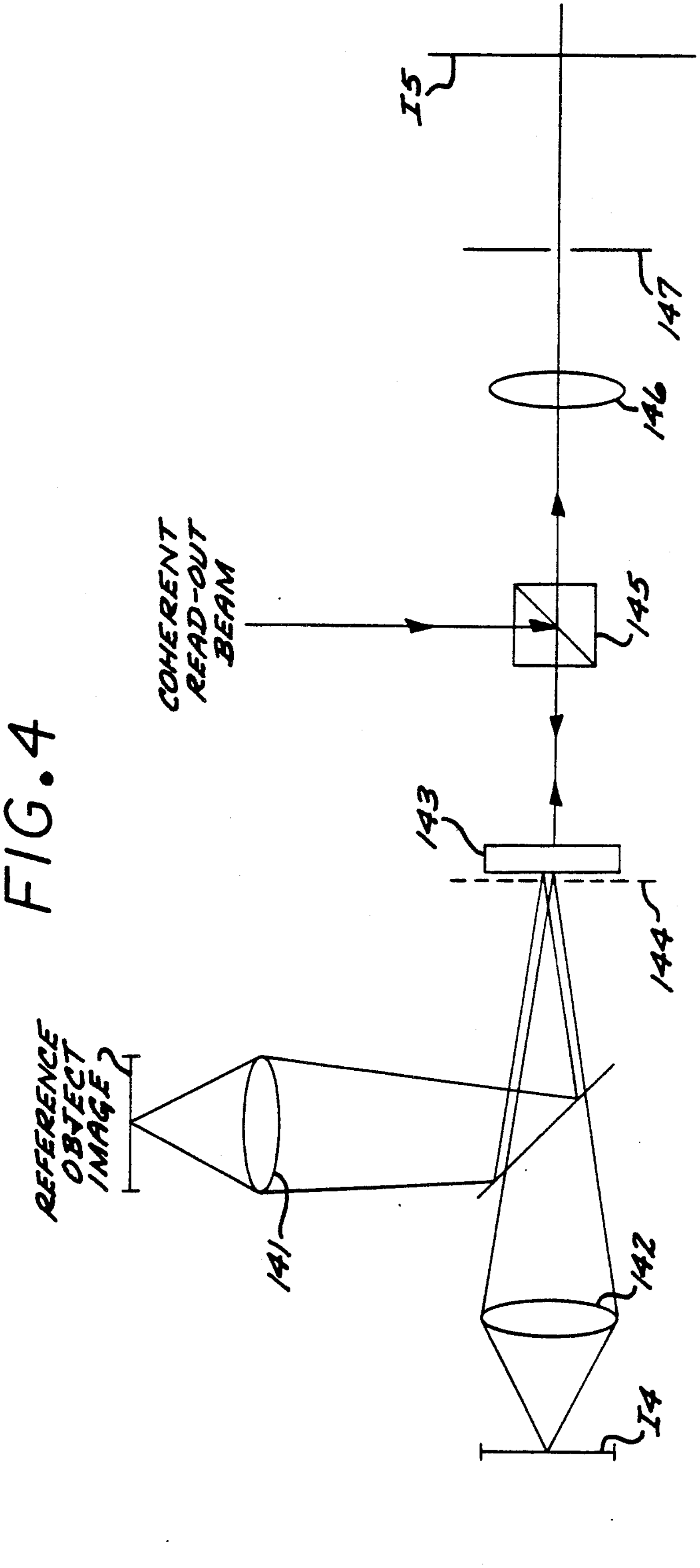
FIG. 4 is a simplified schematic diagram illustrative of a coherent optical processor useful for processing the optical output image of the systems of FIGS. 1 and 2.

The coherent processing for image subtraction is a well known technique. For example, as shown in FIG. 4, the output image I4 from the IFS finder system 90 (FIG. 2) and the reference object image are projected by respective lenses 140 and 141 onto the backside of the liquid crystal light valve (LCLV) 143 through a Ronchi grating 144, a grating with equal width opaque and transparent stripes. The composite image of the output tiled image and reference image is read out by a coherent light beam (a laser beam) from the front side of LCLV and imaged onto the image plane IF through lens 146. A beamsplitter 145 directs the coherent light beam onto the front side of the LCLV 143, and the reflected light beam is transmitted through the beamsplitter 145 to lens 146. A filtering slit 147 is used to select out an odd order of the composite image so that the filtered image on the image plane I5 is just the difference of I4 and the reference object. Using this optical comparison technique, the goodness of the match is indicated by the sum of the pixel intensities at image plane I5 (FIG. 4); the higher the sum, the poorer is the match.

Another technique to minimize the involvement of digital processing and to avoid the complication of coherent optical processing is to use a liquid crystal light valve (LCLV) in non-coherent optical processing for image comparison. In this embodiment, the output image at image plane I4 in FIG. 1 is used for the writing beam of the light valve, and a projected object beam is used for a readout, instead of the usual uniform beam. The light valve output is then focused to a detector. The light valve is designed so that the detector signal indicates the degree of match between the tiled image and the object.

Figure 5:
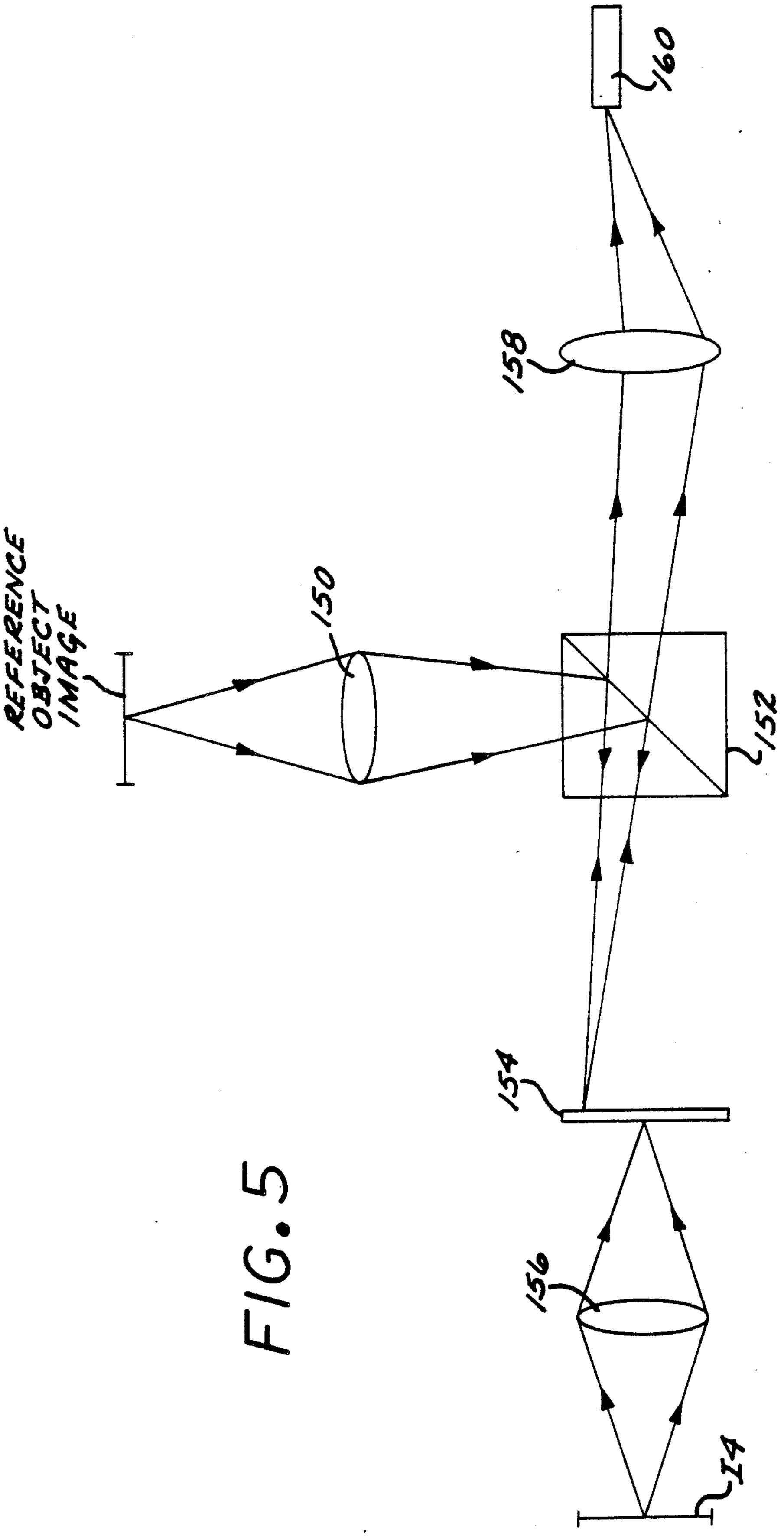
FIG. 5 is a simplified schematic diagram illustrative of an non-coherent optical processor useful for processing the optical output image of the systems of FIGS. 1 and 2.

FIG. 5 is a simplified schematic block diagram illustrating non-coherent optical processing to compare the reference object image and the transformed output image. The transformed output image at image plane I4 (FIG. 1) is relayed through lens 156 to the rear side of the light valve 154, and serves as the writing beam. The reference object image is projected through the lens 150 and the beamsplitter 152 onto the front side of the liquid crystal light valve 154. The light valve 154 is designed such that the reflectivity of the light valve at a given point on the front side of the light valve is proportional to the intensity of the writing beam at a point on the rear side of the light valve opposite the point on the front side. Thus, the reflected light collected by the detector 160 via the beamsplitter 152 and the imaging lens 158 will reach a maximum when the tiled output image at image plane I4 matches the reference object.

The optical affine transformation described here performs only scaling, rotation, and translation. These are the features used in typical IFS applications. The general affine transformation which includes a shearing effect can be done optically, too, if a more complicated optical system is used; for example, including deformed mirrors in the system can create a shearing effect.

It is understood that the above-described embodiments are merely illustrative of the possible specific embodiments which may represent principles of the present invention. Other arrangements may readily be devised in accordance with these principles by those skilled in the art without departing from the scope of the invention.

What is claimed is:

1. A system for finding a proper Iterated Function System (IFS) to model a given object, comprising:

means for providing an input image of the object to be modelled;

means for directing the input image through a plurality of optical branches, each branch for optically performing an affine transformation on the input image, each branch comprising a means for selectively optically rotating the input image, means for selectively optically magnifying or demagnifying the input image, and means for selectively optically translating the input image so as to perform the desired affine transformation;

means for adjusting rotational position of said optical rotating means, said means for adjusting rotational position being responsive to a first control signal;

means for adjusting magnification of said magnifying/demagnifying means, said means for adjusting magnification being responsive to a second control signal;

means for adjusting translation position of said means for optically translating, said means for optically translating being responsive to a third control signal;

optical means for combining the respective transformed images from each branch at an output image plane to provide an output tiled image of the object;

means for comparing the input image to the output image and providing a signal indicative of the goodness of the match between the output image and the input image; and controller means responsive to said signal indicative of the goodness of said match for generating said first, second and third control signals to vary the optical rotation, magnification/demagnification and translation to find an IFS which provides a tiled image which matches the input image of said object.

2. The system of claim 1 wherein said respective optical rotating means comprises a rotatable prism.

3. The system of claim 1 wherein said respective optical magnifying/demagnifying means comprises a zoom lens.

4. The system of claim 1 wherein said optical translating means comprises a translatable mirror.

5. The system of claim 1 wherein said means for comparing comprises a coherent optical processor.

6. The system of claim 5 further comprising means for providing a reference object image of said input image, and wherein said coherent optical processor comprises:

a grating having equal width opaque and transparent stripes;

means for combining said reference image with said tiled output image to provide a combined image and directing said combined image through said grating;

a liquid crystal light valve disposed to receive the combined image light passed through said grating on a first surface of said light valve;

means for generating a coherent read-out beam and directing said beam onto a second surface of said light value to read the image defined thereon resulting from said combined image;

a filtering slit for selecting out an odd order of the composite image;

means for focusing light reflected by said second surface of said light valve through said slit at an image plane, whereby the filtered image appearing at said image plane represents the difference between the tiled output image and the reference object image.

7. The system of claim 1 wherein said means for comparing comprises:

means for providing a reference object image of the object to be modelled;

means for detecting and digitizing said reference object image and providing a digital representation of the reference object image to the controller;

means for detecting and digitizing said output tiled image and providing a digital representation of said output tiled image; and means for performing a digital comparison of said respective digital representations to determine the differences between said digital representations.

8. The system of claim 1 wherein said means for comparing comprises:

a liquid crystal light valve having a first light valve surface and a second light valve surface;

means for projecting said input image of said object to be modeled onto said second light valve surface so as to provide an incident writing beam;

means for directing said output tiled image onto said first light valve surface;

reflectivity at a given point on said first light valve surface being proportional to intensity of said incident writing beam upon said second light valve surface;

an optical detector for providing an electrical output signal indicative of intensity of light incident thereon;

means for imaging light reflected from said first light valve surface onto said optical detector;

whereby said electrical output signal of said optical detector is indicative of the goodness of match between said output tiled image and said input image.

* * * * *